No. 680,787. Patented Aug. 20, 1901.
W. J. KNOX.
GAS MANUFACTURING SYSTEM.
(Application filed Nov. 12, 1900.)

(No Model.) 9 Sheets—Sheet 1.

WITNESSES:
INVENTOR
William John Knox
BY
Charles A. Perry
ATTORNEY.

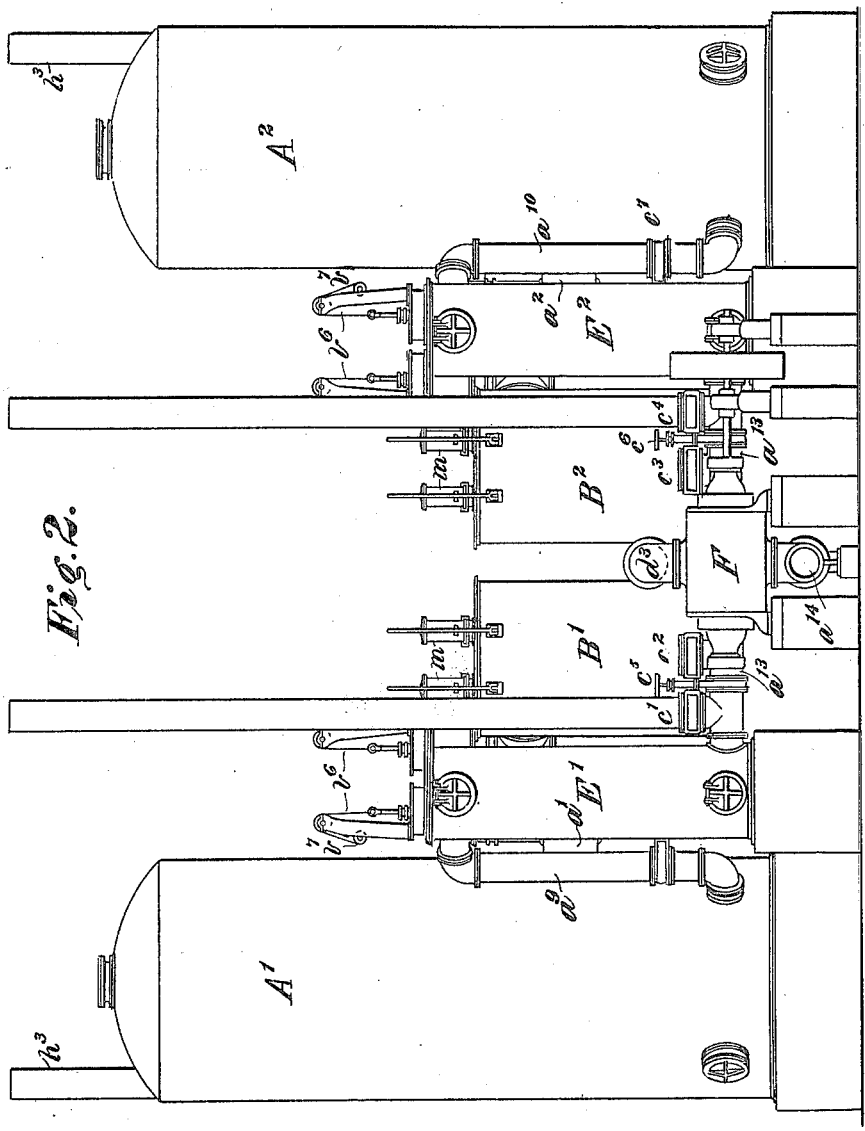

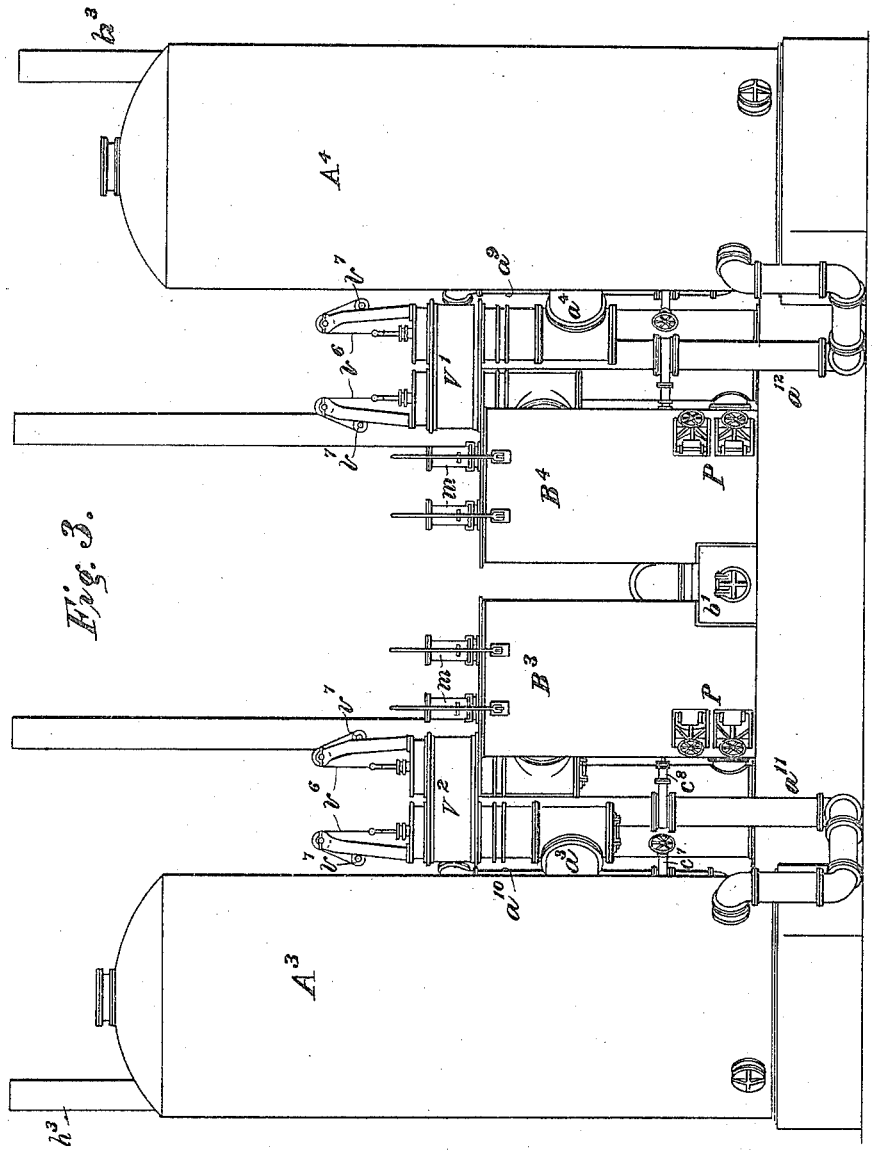

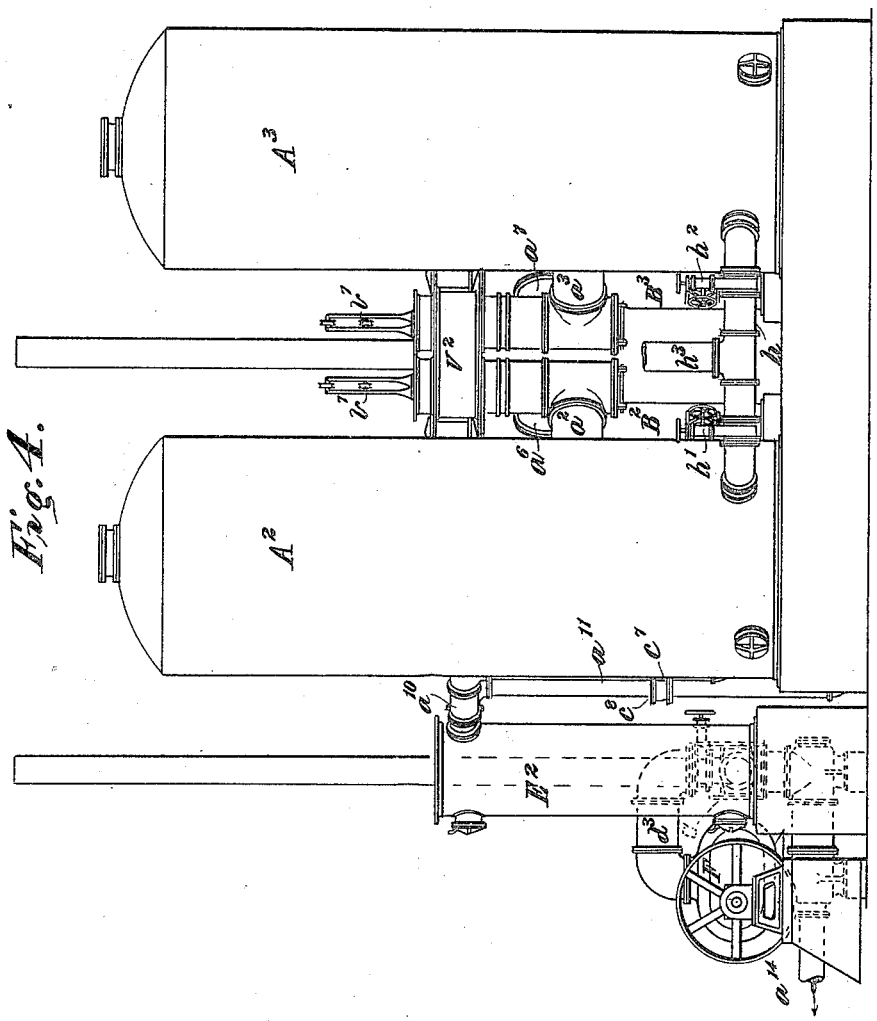

No. 680,787. Patented Aug. 20, 1901.
W. J. KNOX.
GAS MANUFACTURING SYSTEM.
(Application filed Nov. 12, 1900.)
(No Model.) 9 Sheets—Sheet 5.
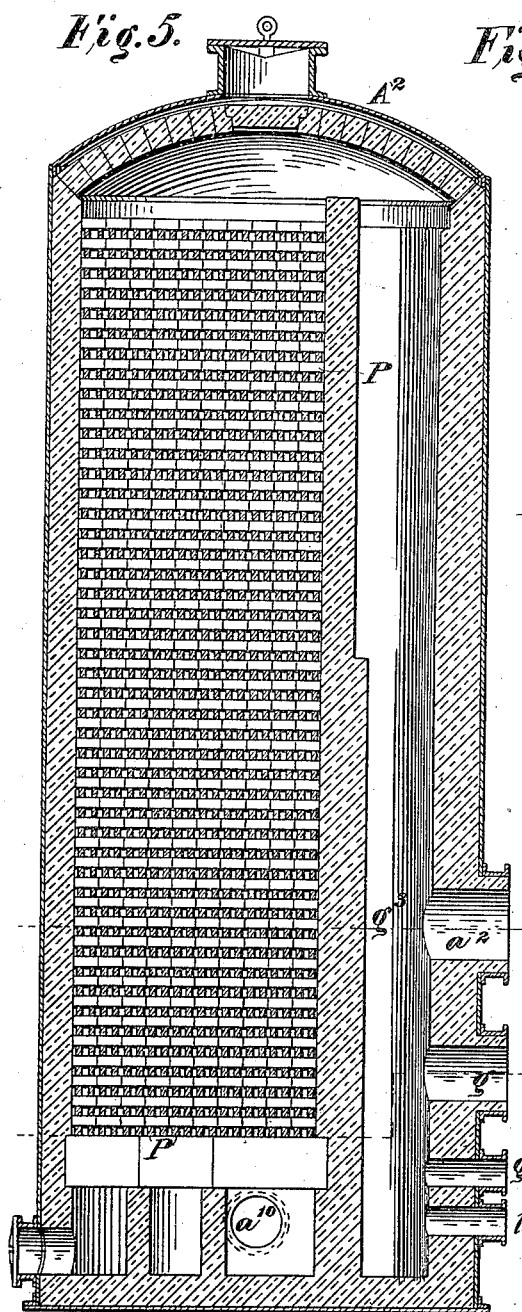
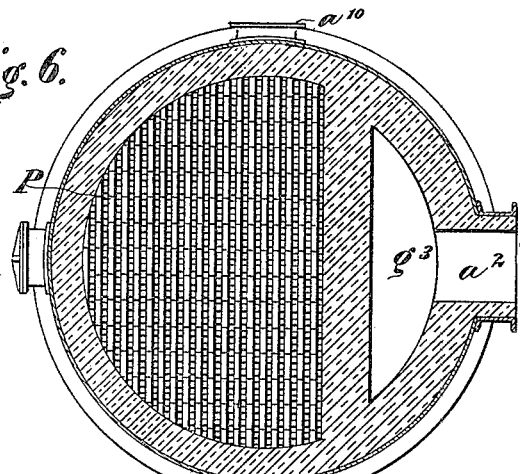
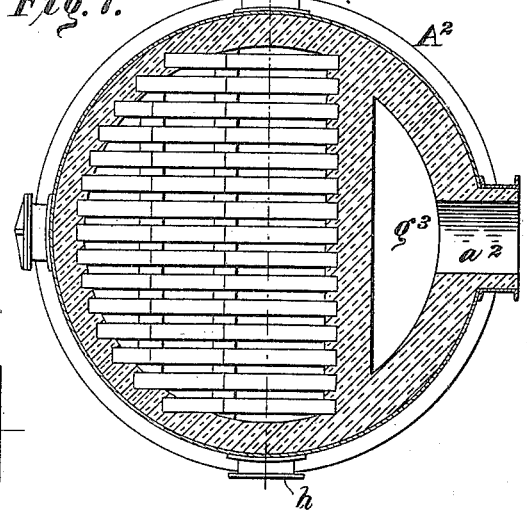
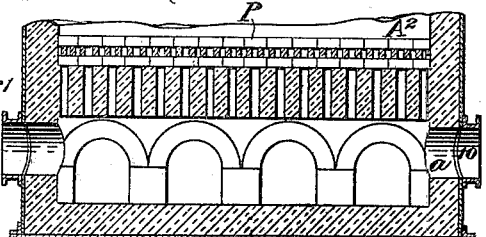
WITNESSES: INVENTOR
William John Knox
BY
Charles A. Perry.
ATTORNEY.

No. 680,787. Patented Aug. 20, 1901.
W. J. KNOX.
GAS MANUFACTURING SYSTEM.
(Application filed Nov. 12, 1900.)
(No Model.) 9 Sheets—Sheet 6.

WITNESSES: INVENTOR
William John Knox
BY
Charles A. Terry,
ATTORNEY.

No. 680,787. Patented Aug. 20, 1901.
W. J. KNOX.
GAS MANUFACTURING SYSTEM.
(Application filed Nov. 12, 1900.)
(No Model.) 9 Sheets—Sheet 7.
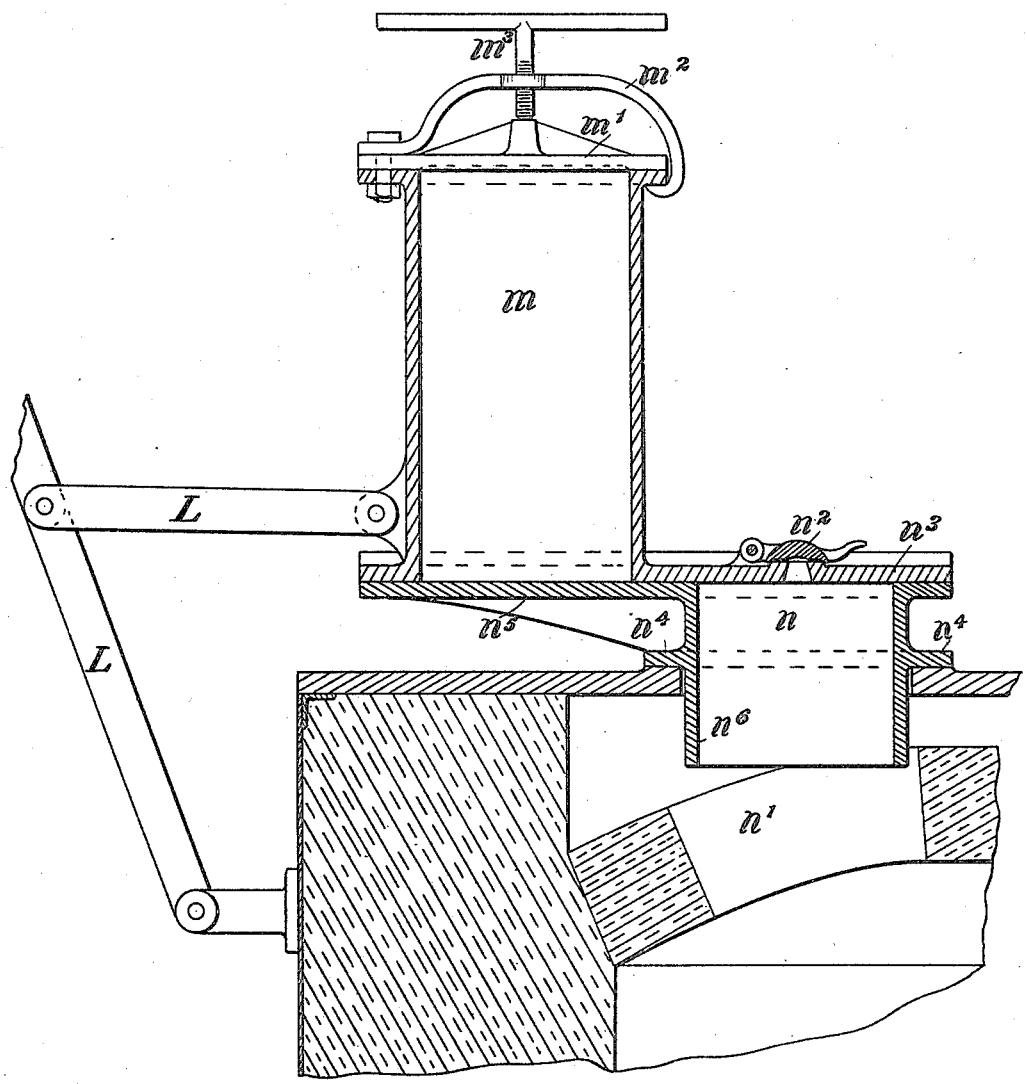

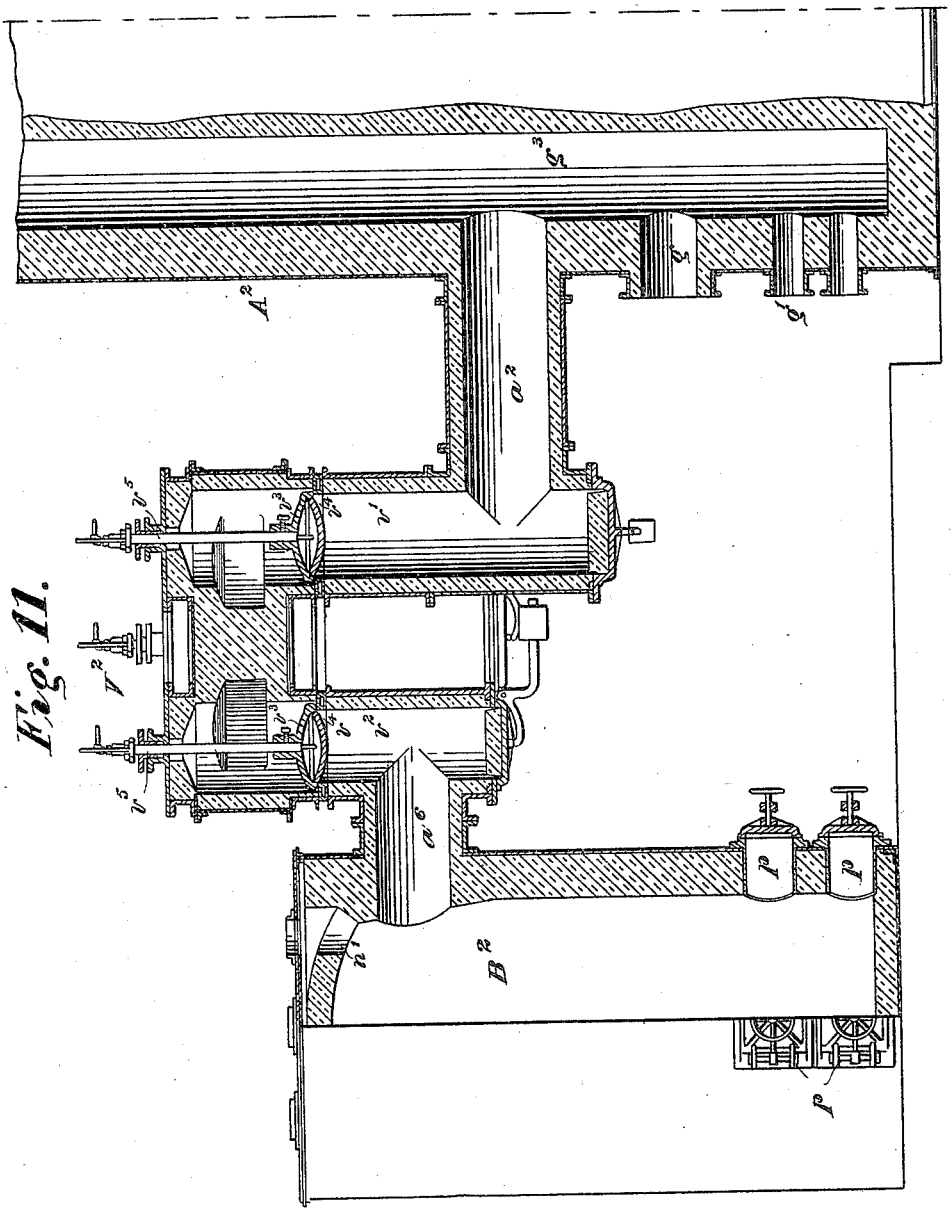

No. 680,787. Patented Aug. 20, 1901.
W. J. KNOX.
GAS MANUFACTURING SYSTEM.
(Application filed Nov. 12, 1900.)
(No Model.) 9 Sheets—Sheet 9.
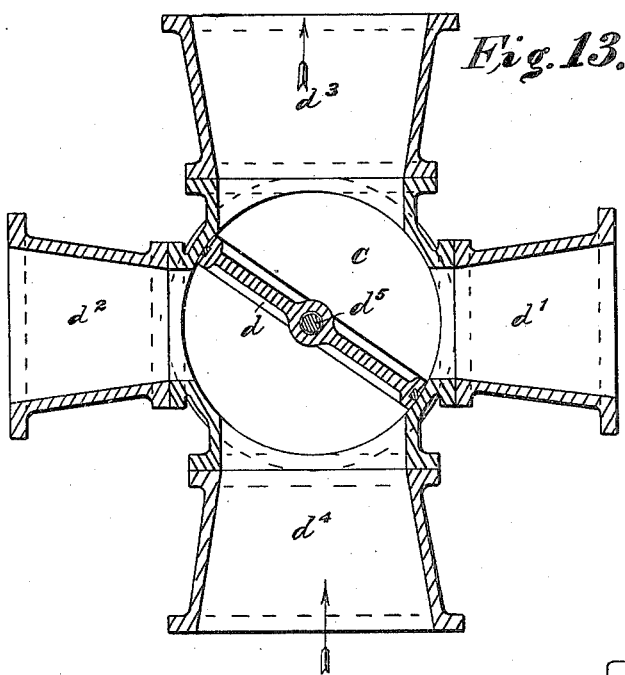
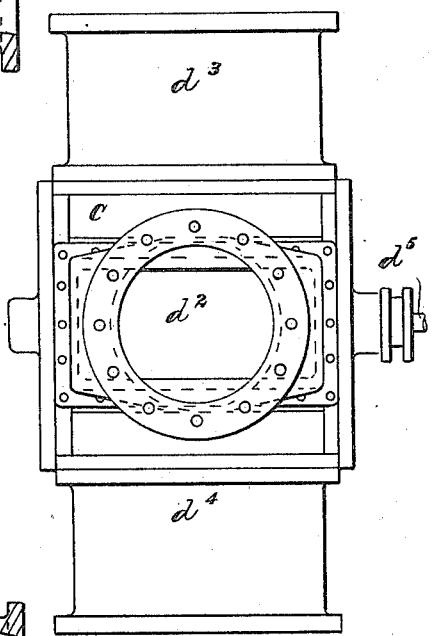
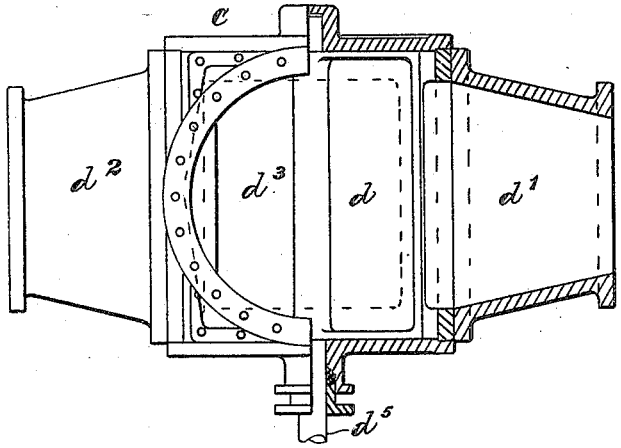
WITNESSES:
INVENTOR
William John Knox
BY
Charles A. Perry.
ATTORNEY.

UNITED STATES PATENT OFFICE.

WILLIAM JOHN KNOX, OF PITTSBURG, PENNSYLVANIA, ASSIGNOR TO GEORGE WESTINGHOUSE, OF SAME PLACE.

GAS-MANUFACTURING SYSTEM.

SPECIFICATION forming part of Letters Patent No. 680,787, dated August 20, 1901.

Application filed November 12, 1900. Serial No. 36,268. (No model.)

*To all whom it may concern:*

Be it known that I, WILLIAM JOHN KNOX, a citizen of the United States, and a resident of Pittsburg, in the county of Allegheny and State of Pennsylvania, have invented certain new and useful Improvements in Gas-Manufacturing Systems, of which the following is a specification.

My invention relates generally to that class of apparatus for manufacturing fuel-gas in which heat is carried into the producers by a volume of circulating gas. In other applications filed by me I have described a system in which a quantity of gas produced in the system is heated and delivered to the producer for maintaining the producer at the proper temperature, the gas passing from the producer being carried through a cooling or heat-absorbing device and its temperature lowered to a minimum, and then such of the gas as is not being drawn off to mains or holders being reheated and the operation continued until the heating device has become cooled, whereupon the direction of circulation is reversed.

The present invention relates more particularly to the detail constructions and forms of apparatus for carrying on the process above referred to.

The method of operation involved in the use of the apparatus described and claimed herein is made the subject of certain other applications for patent filed by me, particularly Serial No. 36,265, filed November 12, 1900.

Figure 1:
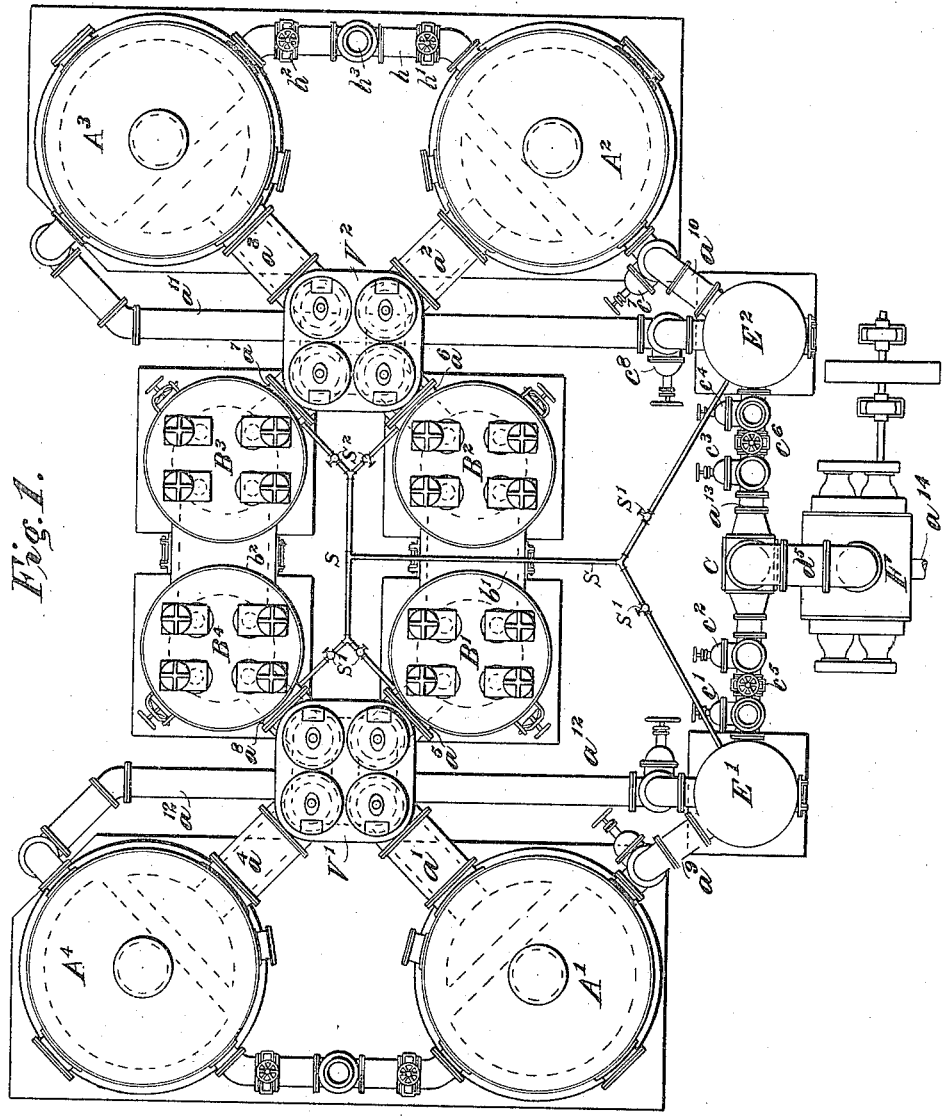
Figure 9:
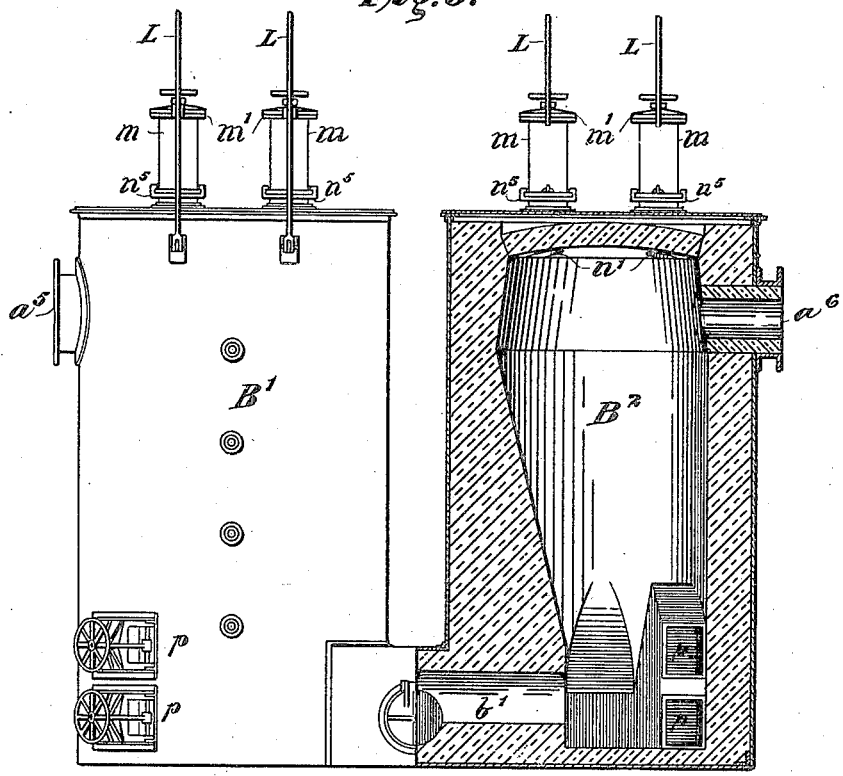
Figure 10:
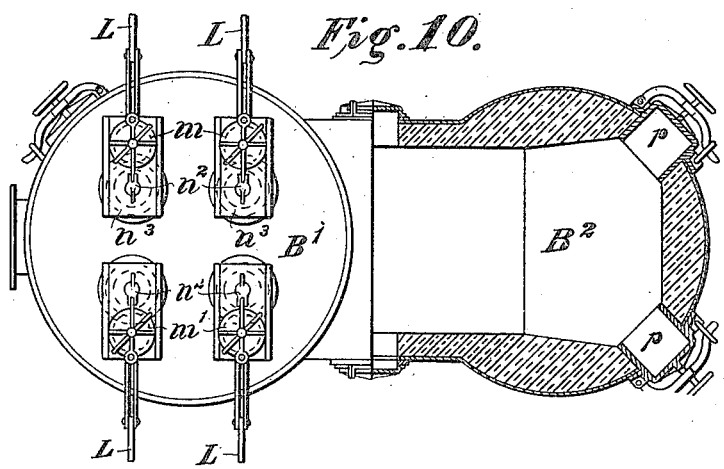

In the accompanying drawings, illustrating the invention, Figure 1 is a plan view of a plant. Fig. 2 is a side elevation. Fig. 3 is a side elevation taken from the opposite side of Fig. 2. Fig. 4 is an end view. Figs. 5, 6, 7, and 8 illustrate the construction of a heater or heat-absorbing device. Figs. 9, 10, and 10$^a$ illustrate details of the construction of the producer. Fig. 11 is a section showing the valve connections between the producer and the heating device. Figs. 12, 13, and 14 illustrate the construction of a butterfly-valve for reversing the direction of the circulation of the gas.

Referring to the drawings, A' A$^2$ A$^3$ A$^4$ represent four stoves or heat-absorbing devices. These devices act in one stage of the process as heating devices for the gas and in another stage as a heat-absorbing device, as will presently appear. Four producers B' B$^2$ B$^3$ B$^4$ are also shown and two economizers or steam-generators E' E$^2$. The stoves are arranged in pairs, and likewise the producers are arranged in pairs, and they are so organized that either stove of one pair may be connected through each pair of producers to either stove of the other pair and the circuit continued back to the other side of the first-named stove. For this purpose the stoves A' and A$^4$, constituting one pair, are connected with the valve-chamber V' by pipes $a'$ $a^4$, respectively, and likewise A$^2$ A$^3$ are connected with a valve-chamber V$^2$ by pipes $a^2$ $a^3$, respectively. The producers B' B$^2$ are connected at their bottoms with each other through a passage $b'$, and likewise the producers B$^3$ B$^4$ are connected by a passage $b^2$. The producer B' is connected at its top with a valve-chamber V' by a pipe $a^5$. The producer B$^2$ is connected with valve-chamber V$^2$ by pipe $a^6$, and likewise producer B$^3$ is connected with valve-chamber V$^2$ by pipe $a^7$ and the producer B$^4$ with the valve-chamber V' by pipe $a^8$.

The valve-chambers V' V$^2$ are respectively organized as shown more clearly in Fig. 11, the purpose being to make it possible to connect, through the common valve-chamber, either of the adjacent producers. In Fig. 11 a portion of the stove A$^2$ is shown in connection with producer B$^2$ and the valve-chamber V$^2$. The valve-chamber is constructed with four cylindrical openings, two of which are shown in Fig. 11 at $v'$ $v^2$. The pipe $a^2$ terminates in the lower end of the passage $v'$, and the pipe $a^7$, leading to the producer B$^2$, terminates in the passage $v^2$, and similar passages are provided for the stove A$^3$ and the producer B$^2$ in the valve-chamber V$^2$. In the passage shown in the drawings the valve-disks V$^3$ rest upon their corresponding seats $v^4$, thus closing the corresponding passages. When, however, any two of the valve-disks are raised—as, for instance, those shown in Fig. 11—a passage-way is opened between the corresponding cylindrical openings, all of the openings communicating with each other in the upper part of the valve-chamber. Any convenient means may be employed for operating the valve-disks through their stems $v^5$. In the drawings I have shown, Figs. 2 and 3, the valves as being counterweighted and operated by means of a cord and drum $v^6$ and $v^7$.

By properly operating the valve-disks it will be seen that either stove $A^2$ or $A^3$ may be placed in circuit with either producer $B^2$ or $B^3$, and likewise either stove $A'$ or $A^4$ may be put in circuit, through the valve-chamber $V'$, with either producer $B'$ or $B^4$.

For convenience of reference the ends of the stoves which are connected with the producers will be termed the "hot" ends of the stoves and the other ends will be termed the "cold" ends of the stoves. For the purpose of completing the gas-circuit from the respective stoves, as required, through the economizers pipes $a^9$ and $a^{12}$ lead from the respective cold ends of the stoves $A'$ $A^4$ to the economizer $E'$, and similar pipes $a^{10}$ and $a^{11}$ lead from the cold ends of the stoves $A^2$ and $A^3$, respectively, to the economizer $E^2$. A pipe $a^{13}$ connects economizers $E'$ $E^2$ with each other on the opposite sides from the entrance of the corresponding pipes of the stoves. A fan F or other suitable device for forcing a circulation of the gas is interposed in the passage between the economizers $E'$ $E^2$. This fan may be inserted directly within the pipe and its direction reversed, or, as shown in the drawings, it may be placed outside of the pipe and connections led thereto, so that by changing the connections the direction of circulation may be reversed without reversing the direction of the motion of the fan. In the drawings I have shown for this purpose a butterfly-valve C, Figs. 12, 13, and 14, having four openings $d'$ $d^2$ $d^3$ $d^4$, the opening $d'$ leading toward the economizer $E'$ and the opening $d^2$ leading toward the economizer $E^2$. The openings $d^3$ and $d^4$ are connected with the opposite sides of fan F. When the valve-disk $d$ is placed in the position shown in the drawings, Fig. 13, the connections are from the pipe $d'$ to the pipe-opening $d^3$, thence down through the fan F into the opening $d^4$ and out through the opening $d^2$. By turning the valve-disk $d$ approximately ninety degrees the connections will be changed, so that the direction of circulation will be from $d^2$ to $d^3$ and from $d^4$ to $d'$, so that the revolution of fan F in the same direction will cause a circulation in the opposite direction through pipe $a^{13}$. Any convenient means may be employed for turning the valve-disk $d$—as, for instance, by mounting it upon a shaft $d^5$, provided with any convenient means for turning it. The pipe $a^{13}$ is also equipped with valves $c'$, $c^2$, $c^3$, $c^4$, $c^5$, and $c^6$. When the plant is in operation, the valves $c'$ $c^2$ $c^3$ $c^4$ are all closed, and the valves $c^5$ and $c^6$ are open, so that a circuit may be completed from one economizer to the other through the fan.

When it is desired to put the system into operation, a fire may be built in one of the producers, $B^2$, for instance. Then the valve $c^6$ is closed and the valves $c^3$ $c^4$ are opened, the valves $c'$ and $c^2$ remaining closed. The pipe $a^{13}$ is then placed in such condition by means of the butterfly-valve that the circulation produced by fan F will be toward the economizer $E'$. This will draw in air from the atmosphere through the valve $c^3$, which will be forced through economizer $E'$ and the stove $A'$, thence (the valves in the chamber $V'$ being properly positioned) through the pipes $a'$ $a^5$ into the producer $B'$, then into producer $B^2$ through the pipes $a^6$ and $a^2$ into the hot end of the stove $A^2$, where the producer-gas formed in the producers is burned, a current of air being supplied thereto by a separate opening $g$, for instance, (shown in Fig. 5,) the products of combustion then passing out from the cold end of the stove through the pipe $a^{10}$, the economizer $E^2$, and out to the atmosphere through the valve $c^4$. This circulation is continued until the stove $A^2$ has become heated. By closing a valve $c^7$ in the pipe $a^{10}$ and opening a similar valve $c^8$ in the pipe $a^{11}$ and properly changing the connections in the valve-chamber $V^2$ producer-gas will be delivered to and burned in the stove $A^3$ and the products of combustion passed through $a^{11}$ and economizers $E^2$ to the outlet-valve $c^4$. In this way the stoves $A^2$ and $A^3$ may be heated. In a similar way the stoves $A'$ $A^4$ may be heated by reversing the direction of circulation caused by the fan F through the instrumentality of valve C and by properly positioning the several valves. When the plant is in operation, the stoves may be periodically reheated without interrupting the process of gas manufacture. To conveniently accomplish this, I provide means for burning gas from an independent source, such as a storage-tank within the several stoves, as required. This operation will be more particularly explained in connection with stove $a^2$, assuming that this stove has been used and cut out for the purpose of being heated. To cut out this stove the valve $c^7$ is closed and the connections in the valve-chamber $V^2$ are made such that the pipe $a^2$ is closed. Between the cold ends of stoves $A^2$ $A^3$ there is a pipe $h$, containing two valves $h'$ and $h^2$, and a stack $h^3$ leads from between the two to the air. The valves $h'$ $h^2$ are closed during the gas-making period; but when it is desired to heat up the stove $A^2$ after being cut out, as above described, the valve $h'$ is opened and gas is admitted from the independent source through an opening $g'$, Fig. 5, into the combustion-flue $g^3$ of the stove, air at the same time being admitted through opening $g$. The combustion of this gas heats up the checkerwork P of the stove. The products of combustion pass out through the pipe $h$ and the stack $h^3$. The remaining stoves are heated from time to time in a similar manner. The last-named method of heating the stoves may be adopted in originally starting the plant, if desired.

The construction of the producers which I usually prefer is as follows: Two producers, constituting a pair, are connected with each other at their bottoms by the passage $b'$ or $b^2$, already referred to, while their tops are connected with the corresponding valve-chambers, so that gas entering the first of a pair enters at the top and passes downward through the contents, thence into the bottom of the second of the pair and upward and out at its top. This is a desirable arrangement, because the contents of the first producer can be converted into water-gas in the most advantageous manner while the second producer is being charged with a fresh supply of bituminous coal.

For the purpose of supplying steam or hot water to the producers for water-gas making from such materials as do not carry sufficient water themselves the steam or hot water may be supplied from an external source or, as shown in the drawings, from economizers $E'$ $E^2$. A convenient way to do this is to provide a system of pipes $s$, leading from the two economizers to the several producers, suitable valves $s'$ being inserted in these pipes for controlling the connections, as required. The pipes deliver steam or hot water to the producers through the pipes $a^5$, $a^6$, $a^7$, and $a^8$, respectively.

The operation of the plant is as follows: When the plant has been put in an operative condition by heating the stoves, as already described, two of the stoves, $A'$ and $A^2$, for instance, are connected with one set of producers, $B'$ and $B^2$, for instance, and assuming the stove $A^2$ is used for heating the circulating gas the valve $C$ is in such condition as to cause the circulation to take place through economizer $E^2$ into stove $A^2$, where it becomes heated to the gas-making temperature. This gas passes into the producer $B^2$, entering at its top and passing downward and from the bottom of this producer into the bottom of producer $B'$, steam being admitted to the producer $B^2$ in the manner already described. Water-gas is thus generated in the producer $B^2$, and the circulating gas with the additional generated gas passes into the producer $B'$, distilling the hydrocarbons from coal which is being fed thereto, thence out through the pipe $a^5$, and by way of pipe $a'$ into stove $A'$. In this stove heat is absorbed from the gas, and the hydrocarbons are broken up and fixed into permanent gases. The gases pass out from the cold end of this stove to the economizer $E'$, where additional heat is absorbed, forming steam. Thence they pass to the valve $a^{13}$ and fan F, a portion passing out from the system through an outlet-pipe $a^{14}$, leading to a holder or gas-main, and the remainder passing on and repeating the circuit. This operation is continued until the stove $A^2$ has cooled below the desirable gas-making temperature, whereupon the stove $A'$ is cut out and is reheated by the combustion of gas therein in the manner already described, and the circuit connections are changed, so that the stove $A^4$ is introduced and the direction of circulation changed, so that the circulation will be into the cold end of stove $A^4$ by the way of pipe $a^{12}$ out from the hot end of this stove through the pipe $a^4$ to the producer $B'$, which has now become filled with coke formed by the destructive distillation of the bituminous coal with which it has been fed during the previous steps in the operation. Steam is meanwhile fed to this producer and water-gas formed therein. The combined gases then pass upward through producer $B^2$, which is now being fed with coal, and the hydrocarbons are distilled therefrom, the gases passing into the hot end of the stove $A^2$, which now acts in the same manner as stove $A'$ acted in the previous step. Thence the gases pass out through the cold end of the stove $A^2$ to the economizer $E^2$ and valve C, a portion of the gases equivalent to that being generated passing out through $a^{14}$ and the remainder continuing its circuit. When the stove $A^4$ has cooled below the desirable gas-making temperature, the stove $A^2$ is cut out and the stove $A^3$ is cut into circuit, and then the stove $A^3$ becomes the heating-stove and the stove $A^4$ the heat-absorbing stove, and the stove $A^2$ is heated by combustion of gas therein. The next step in the operation is to use the stove $A'$ as the heating-stove and the stove $A^3$ as the heat-absorbing stove. The succeeding step uses the stove $A^2$ as the heating-stove and the stove $A'$ as the heat-absorbing stove, and thus the operation is repeated, each stove being heated during the two preceding steps in the operation. This makes it possible to heat the stoves economically during a period twice as long as the time they are used as heating-stoves. It should also be noticed that in each step the stove which was previously the heating-stove becomes the heat-absorbing stove. During the time that a stove is used as a heating-stove its temperature falls to such a degree that it may then be used as a heat-absorbing stove and economically deliver the gases from its cold end at the minimum temperature.

In some cases it may be desirable to omit economizers $E'$ and $E^2$ and depend entirely upon the heat-absorbing qualities of the stove used for heating purposes to conserve the heat of the system.

For conveniently feeding the coal to the producers I usually employ a form of hopper of the general character shown in Figs. 9, 10, and $10^a$, and each producer may be provided with any desired number (in the drawings four are shown) of these hoppers. The hopper $m$ is mounted upon a table $n^5$ and capable of being moved by levers L over the opening $n$, provided with a flange $n^6$, terminating above an opening $n'$ in the dome of the producer. This flange rests upon the top of the producer by means of a lateral support $n^4$. The extension $n^3$ covers the opening $n$ when the hopper is withdrawn from the opening. A lid $n^2$ may be provided for allowing gases to escape or for inspection. The top of the hopper may be closed by a lid $m'$ and clamps $m^2$ $m^3$. At the bottom of the producers openings $p$ may be located for cleaning the producers and for inspection.

In the foregoing description I have referred to a fan F, which is driven in a constant direction in any convenient manner. It will be understood, however, that if instead of employing a gas-engine or some device which is not easily reversed a propelling device is used for the fan which may itself be reversed then the reversing-valve shown in Figs. 12, 13, and 14 may be dispensed with.

The invention claimed is—

1. The combination of four producers, four heating-stoves, valve connections between two of the producers and two of the heating-stoves, valve connections between the remaining two producers and the remaining two heating-stoves, connections between the two first-named producers and the two remaining producers, respectively, and means for causing a circulation of gas from either of the first-named heating-stoves through either of the two thus-connected producers and into either of the remaining stoves.

2. The combination of four heating-stoves arranged in pairs, four producers arranged in pairs, the individual producers of each pair being connected with the others at their bottom, valve connections between each pair of stoves and each pair of producers, and connections whereby each pair of producers may be connected with each other independently of the producers.

3. The combination of four producers arranged in pairs, four stoves arranged in pairs, means for connecting either stove of each pair with either stove of the other pair through two of the producers, and means for connecting either stove of either pair with either stove of the other pair.

4. The combination of four producers arranged in pairs, four stoves arranged in pairs, means for connecting either stove of each pair with either stove of the other pair through two of the producers, means for directly connecting either stove of either pair with either stove of the other pair, and means for causing a circulation of gas in either direction through the stoves and producers thus connected.

5. The combination of four stoves arranged in pairs, two producers through which a connection may be made from either stove of either pair to either stove of the other pair, and means for causing a circulation of gas from one stove through the producers to the other stove and back to the first-named stove.

6. The combination of four stoves arranged in pairs, two producers through which a connection may be made from either stove of either pair to either stove of the other pair, means for causing a circulation of gas from one stove through the producers to the other stove and back to the first-named stove, and one or more economizers or steam-generators located in the circuit between the two stoves thus connected with the producers.

7. The combination of four stoves arranged in pairs, two producers through which either stove of either pair may be connected with either stove of the other pair, one or more economizers through which the stoves of the respective pairs may be connected with each other, a fan or equivalent device for causing a circulation of gas through the producers, and means for reversing the direction of such circulation.

8. The combination of two producers, two or more heating-stoves, means for connecting the same with each other through the producers, connections between the two stoves independently of the producers, valves included in the last-named connections whereby air may be admitted thereto, and means for forcing air into either stove and thence into a corresponding producer.

9. In a gas-producing plant, a producer and a stove and an interposed valve comprising two chambers respectively connected with the stove and with the producer, a valve-disk within each of said openings, and a chamber common to both openings, the entrance to which is controlled by said valve-disks.

10. In a gas-generating plant, the combination of two producers and two or more heating-stoves arranged to be connected in series therewith, a fan for causing a circulation of gas therethrough, means for driving the fan in a given direction, and a device for reversing the direction of flow produced by the fan, consisting of a two-way valve, and means for causing the inlet and the outlet openings thereof to be reversed at will.

11. The combination of four stoves arranged in pairs and four producers arranged in pairs, and connections whereby either stove of either pair may be connected to either pair of producers and that pair of producers connected to either of the other pair of stoves.

12. The combination of four stoves arranged in pairs and four producers arranged in pairs, connections whereby either stove of either pair may be connected to either pair of producers and that pair of producers to either of the other pair of stoves, and means whereby a circulation may be established through the series thus connected.

13. The combination of four stoves arranged in pairs and four producers arranged in pairs, connections whereby either stove of either pair may be connected to either pair of producers and that pair of producers to either of the other pair of stoves, means whereby a circulation may be established through the series thus connected, and means whereby this circulation may be reversed.

14. In a gas-producing plant the combination of a producer, two stoves connected in a closed series therewith, a fan or other device for causing a flow of air or gas through the producer and through the two stoves in series and openings into the connections leading from the producer to the respective stoves and valves for controlling these openings whereby air may be admitted to and products of combustion discharged from the closed system.

Signed at Pittsburg, in the county of Allegheny and State of Pennsylvania, this 7th day of November, A. D. 1900.

WILLIAM JOHN KNOX.

Witnesses:
J. A. ADAMS,
R. J. BRATTON.